US011117303B2

(12) United States Patent
Stündl et al.

(10) Patent No.: US 11,117,303 B2
(45) Date of Patent: Sep. 14, 2021

(54) METHOD AND DEVICE FOR MELT-SPINNING, DRAWING, CRIMPING AND WINDING MULTIPLE THREADS

(71) Applicant: Oerlikon Textile GmbH & Co. KG, Remscheid (DE)

(72) Inventors: Mathias Stündl, Wedel (DE); Stefan Kalies, Hoffeld (DE); Marco Kaulitzki, Nortorf (DE); Jan Westphal, Schülp (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 924 days.

(21) Appl. No.: 15/123,454

(22) PCT Filed: Mar. 3, 2015

(86) PCT No.: PCT/EP2015/054388
§ 371 (c)(1),
(2) Date: Sep. 2, 2016

(87) PCT Pub. No.: WO2015/135794
PCT Pub. Date: Sep. 17, 2015

(65) Prior Publication Data
US 2017/0072611 A1     Mar. 16, 2017

(30) Foreign Application Priority Data

Mar. 8, 2014 (DE) .................... 10 2014 003 317.1

(51) Int. Cl.
*B29C 48/05* (2019.01)
*D01D 5/16* (2006.01)
(Continued)

(52) U.S. Cl.
CPC ............ *B29C 48/05* (2019.02); *B29C 48/002* (2019.02); *B29C 48/0018* (2019.02); *D01D 5/08* (2013.01);
(Continued)

(58) Field of Classification Search
CPC ............ B29C 47/0014; B29C 47/0057; B29C 47/0061; B29C 48/0018; B29C 48/002;
(Continued)

(56) References Cited

U.S. PATENT DOCUMENTS

| 6,120,715 A | 9/2000 | Weigend |
| 2005/0151295 A1 | 7/2005 | Schemken et al. |

(Continued)

FOREIGN PATENT DOCUMENTS

| DE | 10053073 A1 | 5/2002 |
| DE | 102007024765 A1 | 11/2008 |
| EP | 1449495 A2 | 8/2004 |

*Primary Examiner* — Xiao S Zhao
*Assistant Examiner* — Joseph S Leyson
(74) *Attorney, Agent, or Firm* — BainwoodHuang

(57) ABSTRACT

Techniques are directed to melt spinning, drawing, crimping and winding multiple threads. The threads are spun from a plurality of spinnerets of a spinning device and are drawn as a thread group by a drawing device and are subsequently fed for crimping next to one another to a plurality of texturing units. In order to obtain identical treatment of all threads within the thread group, the threads are guided individually with a plurality of wraps next to one another on a godet unit and, after running off from the godet unit, are guided in a straight thread run parallel next to one another into the texturing units. To this end, adjacent texturing units of the crimping device form a treatment spacing between themselves which is such that, in the case of being guided individually with a plurality of wraps on the godet unit, the threads can be guided in parallel in a straight thread run.

13 Claims, 3 Drawing Sheets

Figure 1:
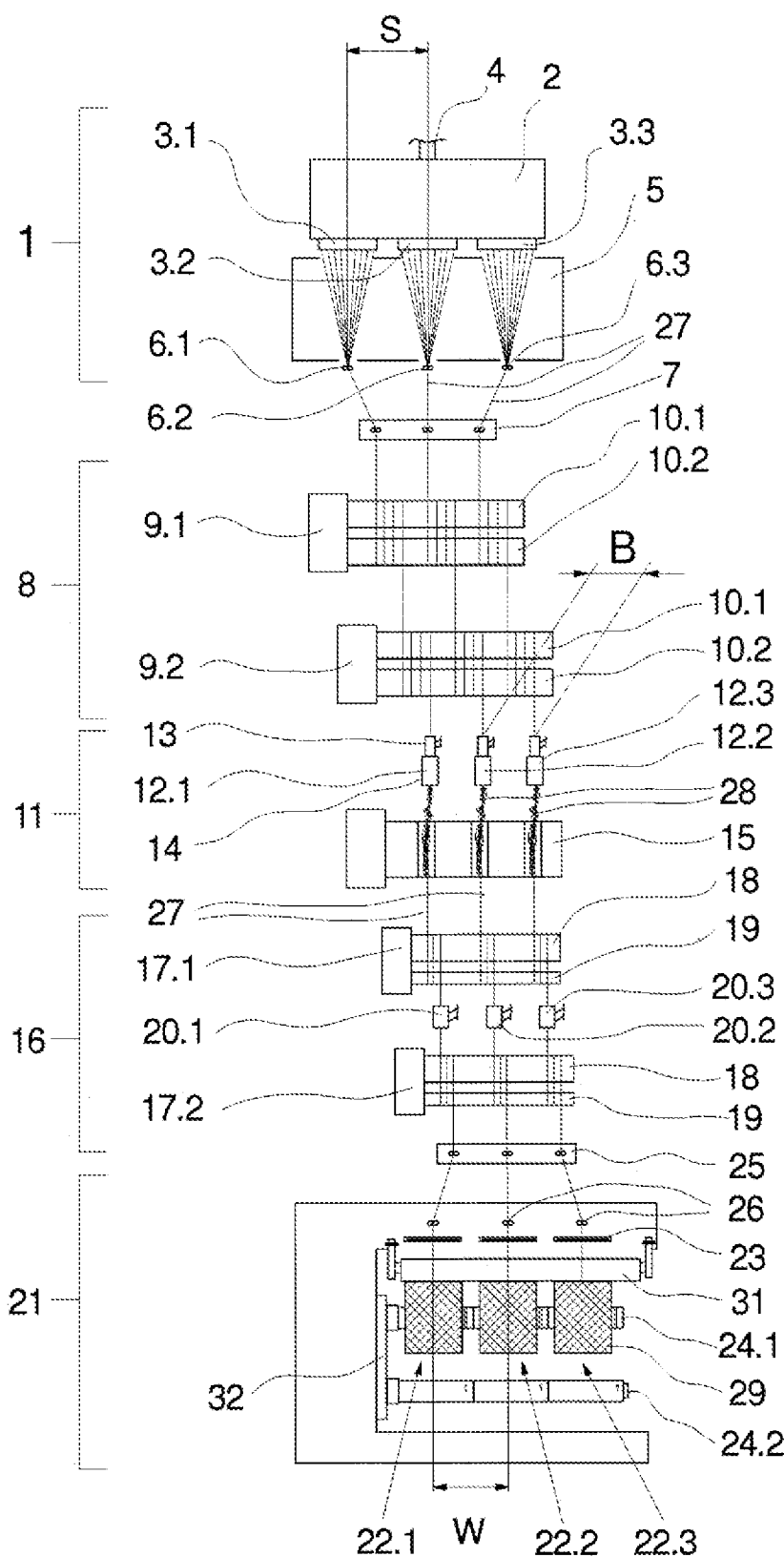

(51) Int. Cl.
*D01D 5/22* (2006.01)
*D01D 13/00* (2006.01)
*D01D 5/08* (2006.01)
*B29C 48/00* (2019.01)
*D02G 1/12* (2006.01)
*D01D 10/02* (2006.01)
*D01D 13/02* (2006.01)
*B29L 31/00* (2006.01)

(52) U.S. Cl.
CPC ............... *D01D 5/16* (2013.01); *D01D 5/22* (2013.01); *D01D 10/02* (2013.01); *D01D 13/00* (2013.01); *D01D 13/02* (2013.01); *D02G 1/12* (2013.01); *B29L 2031/731* (2013.01)

(58) Field of Classification Search
CPC . B29C 48/05; D01D 5/16; D01D 5/22; D01D 7/00; D01D 13/00; D01D 13/02; D01D 5/08
See application file for complete search history.

(56) References Cited

U.S. PATENT DOCUMENTS

| | | |
|---|---|---|
| 2006/0003037 A1 | 1/2006 | Kirchhoff et al. |
| 2006/0120667 A1 | 6/2006 | Reed et al. |
| 2007/0027565 A1* | 2/2007 | Muhlenmeister ........ D01D 5/08 700/109 |
| 2013/0049253 A1 | 2/2013 | Stundl et al. |
| 2013/0221559 A1* | 8/2013 | Schafer .................. D01D 5/096 264/103 |

* cited by examiner

METHOD AND DEVICE FOR MELT-SPINNING, DRAWING, CRIMPING AND WINDING MULTIPLE THREADS

The invention relates to a method for melt-spinning, drawing, crimping, and winding a plurality of threads as disclosed herein. The invention further relates to a device for melt-spinning, drawing, crimping, and winding a plurality of threads as disclosed herein.

In the production of crimped threads in a melt-spinning process it is usual for the threads after extrusion to be collectively guided and treated as a thread group. In this way, it is usual for the threads to be collectively guided at a mutual spacing on the circumference of godet units. Depending on the respective treatment step and on the treatment apparatus, dissimilar thread spacings are required between the threads. In this way, a spinning pitch which defines the mutual spacing of the spinning nozzles has to be adhered to when the threads are being extruded, for example. After extruding, and in order to be guided on the godet units, the threads may be guided at a substantially tighter mutual treatment spacing. The dissimilar thread spacings require that the threads have either to be spread apart or gathered. Since all threads of the thread skein of a thread group have to be produced and treated as far as possible under identical conditions, the deflections of the individual threads are limited so as to keep the thread tension acting on the threads as uniform as possible. On account thereof, very long transition zones for guiding the threads from a short thread spacing to a large thread spacing often result. Such spreading or gathering of threads may indeed be facilitated by additional thread guides, the latter however have the disadvantage of each thread guide generating mechanical stress and thus additional tensile force on the thread. Such undesirable friction points are therefore avoided as far as possible in the guiding of threads. Therefore, attention has to be paid in particular in the production of crimped threads that no irregularities are created by virtue of dissimilar thread guide paths. Herein, the infeed to the texturing apparatuses in which a crimp in the filament strands in the threads is generated is particularly sensitive.

A method of the generic type and a device of the generic type are known from EP 1 449 945 A2, in which the threads of a thread skein are spread out between a godet unit and a crimping installation, wherein the texturing apparatuses of the crimping installation are held in a fan-like manner such that neither deflecting nor kinking arises in the run-in to the texturing apparatuses. The texturing apparatuses are thus utilized in thread guiding in order to spread out the thread skein, wherein the instances of redirection are dislocated to a region in which the threads are compressed so as to form a thread plug.

In the case of the known method and of the known device, the threads may indeed be guided directly into the texturing apparatuses, without any redirecting and kinking, but with the disadvantage that the threads by virtue of being spread out are guided in an oblique manner across the godet. Herein, there is the issue that individual filament ruptures may arise in particular in the case of threads from polymers which tend to adhere to godets, or that the effects of friction on the godet lead to color variations in the case of multi-colored threads. Furthermore, the deflection that has been relocated to the region of the thread plug leads to irregularities in the density of the plug, this being particularly relevant during cooling for permanently setting the crimp.

In principle, however, other methods and devices for melt-spinning, drawing, crimping, and winding a plurality of threads, in which the threads after extrusion are not guided as a thread group but individually, are known in the prior art. In this way, a method and a device are known for example from US 2005/0151295 A1, in which each individual thread after extrusion is separately drawn off, drawn, crimped, and wound to form a package. Spreading or gathering the thread skein is completely avoided herein. However, methods of this type and devices of this type require a high investment in terms of equipment in order for a multiplicity of threads to be able to be simultaneously produced.

It is thus an object of the invention to provide a method of the generic type and a device of the generic type for melt-spinning, drawing, crimping, and winding a plurality of threads, by way of which method and device, respectively, a group of threads may be guided with a high level of uniformity as a thread skein, and be separately crimped.

According to the invention, this object is achieved by a method as disclosed herein, and by a device as disclosed herein.

Advantageous refinements of the invention are defined by the features and combinations of features as disclosed herein.

The invention is distinguished in that each thread within the thread skein is subject to identical thread guiding and identical treatment. To this end, the threads in a singularized manner and with a plurality of wrappings are guided beside one another on at least one of the godet units such that an overall larger thread spacing arises between the threads on the godet unit. Once the threads run off from the godet unit, the former are guided directly into the texturing apparatuses in a straight thread run in parallel beside one another, such that identical conditions prevail on each of the threads. In this way, the thread spacings between the run-off from the godet unit and a run-in into the texturing apparatuses may in particular be embodied in a particularly short manner, which favorably influences in particular temperature control of the threads.

Certain techniques are directed to melt spinning, drawing, crimping and winding multiple threads. The threads are spun from a plurality of spinnerets of a spinning device and are drawn as a thread group by a drawing device and are subsequently fed for crimping next to one another to a plurality of texturing units. In order to obtain identical treatment of all threads within the thread group, the threads are guided individually with a plurality of wraps next to one another on a godet unit and, after running off from the godet unit, are guided in a straight thread run parallel next to one another into the texturing units. To this end, adjacent texturing units of the crimping device form a treatment spacing between themselves which is such that, in the case of being guided individually with a plurality of wraps on the godet unit, the threads can be guided in parallel in a straight thread run.

The device according to the invention achieves the object in that the adjacent texturing apparatuses of the crimping installation therebetween form a treatment spacing in such a manner that the threads in the case of singularized guiding with a plurality of wrappings on the godet unit are capable of being guided in parallel and in a straight thread run. Due to the singularized thread guiding of the threads, arbitrary guide spacings between the threads may thus be implemented. The circumferential portions of the godet unit between adjacent threads are in each case utilized for the wrappings of the thread such that sufficient contact lengths on the circumference of heated godets are in particular implementable for temperature-controlling the threads. A godet unit herein is understood to be a roller pair which enables multiple wrappings of the thread. The roller pair herein may be formed from two driven heated godets, or from one heated godet and one overflow roller.

The texturing apparatuses used for producing crimped threads in the melt-spinning process utilize what is referred to as the "stuffer box" principle in which the heated multi-filament thread is compressed to form a thread plug. To this extent, the refinement of the method according to the invention in which for crimping the threads are each compressed to form a thread plug, and in which the thread plugs are guided in parallel beside one another, and are dissolved to form crimped threads, is particularly advantageous. In this way, the treatment of the thread plugs in the production of a thread skein of crimped threads is also capable of being carried out at high uniformity.

The dissolving of the thread plug herein is also advantageously performed with threads which are guided in parallel and which are drawn off in parallel beside one another by a godet unit, wherein the threads for post-treatment in a singularized manner and with a plurality of wrappings are guided beside one another on the godet unit.

In order for the uniform treatment of the threads to be improved, the refinement of the invention is provided in which the threads after being spun are drawn and crimped in parallel beside one another at a mutual spinning spacing. Gathering of the thread skein after spinning is thus not required, so that the threads after spinning, between the spinning installation and the drawing installation, may be received and guided at very short spacings.

In principle, however, there is also the potential for the treatment spacing during crimping of the threads to be tuned to the subsequent winding of the threads to form packages such that the threads before being wound to form a plurality of packages are drawn and crimped in parallel beside one another, at a mutual winding spacing which is contingent on the packages.

In the case of the threads after being spun and until being wound to form packages being guided in parallel at a mutual non-modified spacing, there is the potential for particularly compact thread guiding. This variant of the method, however, is distinguished in particular by the uniformity of thread production. In this way, each of the threads of the thread skein may be produced under identical conditions, having identical thread guiding without additional redirections or deflections.

In the case of the device according to the invention, the refinement in which the treatment spacing between the texturing apparatuses is determined by a number of wrappings of one of the threads on the godet units is preferably embodied. In this way, the contact length between the thread and a heated surface of a godet of the godet unit, which contact length is relevant to the heating of the thread, may be considered in the context of thread guiding, so as to transfer the already heated thread by way of a short transition zone directly into the texturing apparatuses. The number of wrappings on the godet units herein defines the contact length between the thread and a heated godet surface.

In the production of crimped threads, it is generally typical for the crimping to be followed by a post-treatment. To this extent, the refinement of the device according to the invention in which a post-treatment installation having a plurality of swirling apparatuses is disposed downstream of the crimping installation is preferably embodied, wherein adjacent swirling apparatuses are held at the mutual treatment spacing. Thus, the parallel guiding of threads in the thread skein may even be maintained for post-treatment. Gathering of the thread skein is not required.

In order for as compact a device as possible for producing the crimped thread skein to be obtained, the device according to the invention may be embodied in various variants. In this way, there is the potential for a spinning spacing which is provided between adjacent spinning nozzles of the spinning installation to be chosen so as to be equal to the treatment spacing between the texturing apparatuses. Alternatively, however, the treatment spacing between the texturing apparatuses may also be configured so as to be equal to a winding spacing between adjacent winding positions of the winding installation. The alternative in which the spinning spacing between adjacent spinning nozzles and the winding spacing between adjacent winding positions are of identical size is particularly advantageous for a compact arrangement.

Figure 2:
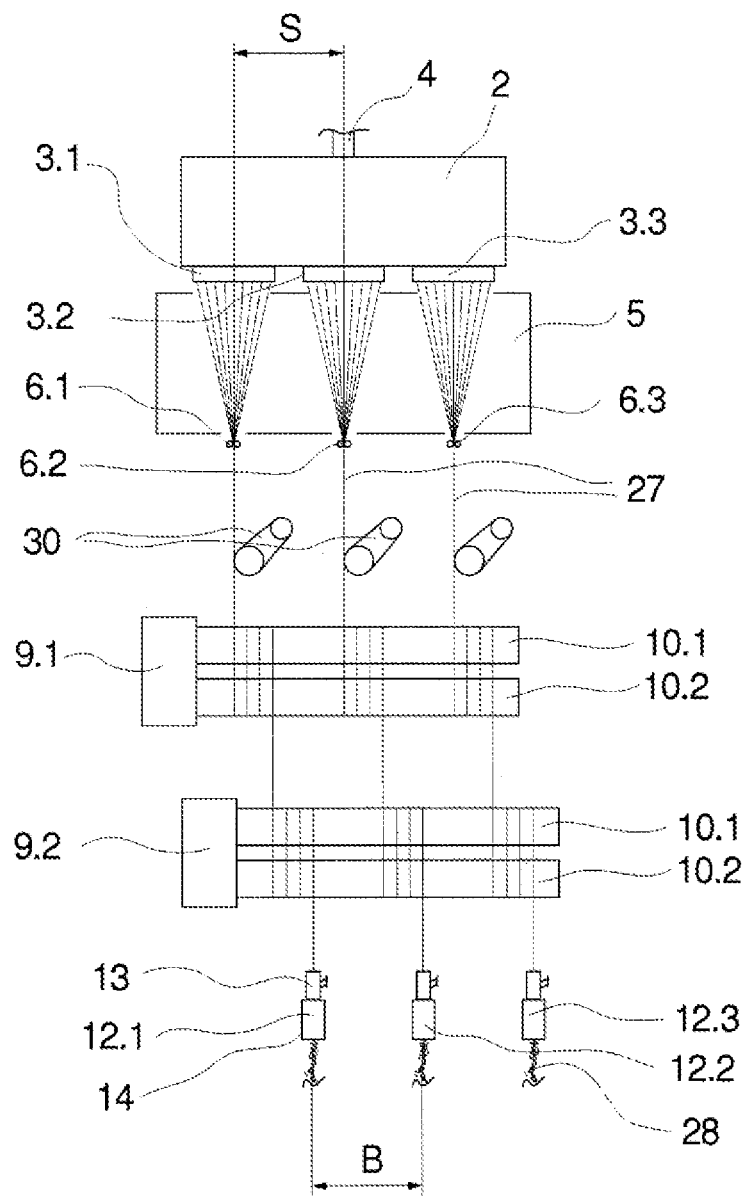
Figure 3:
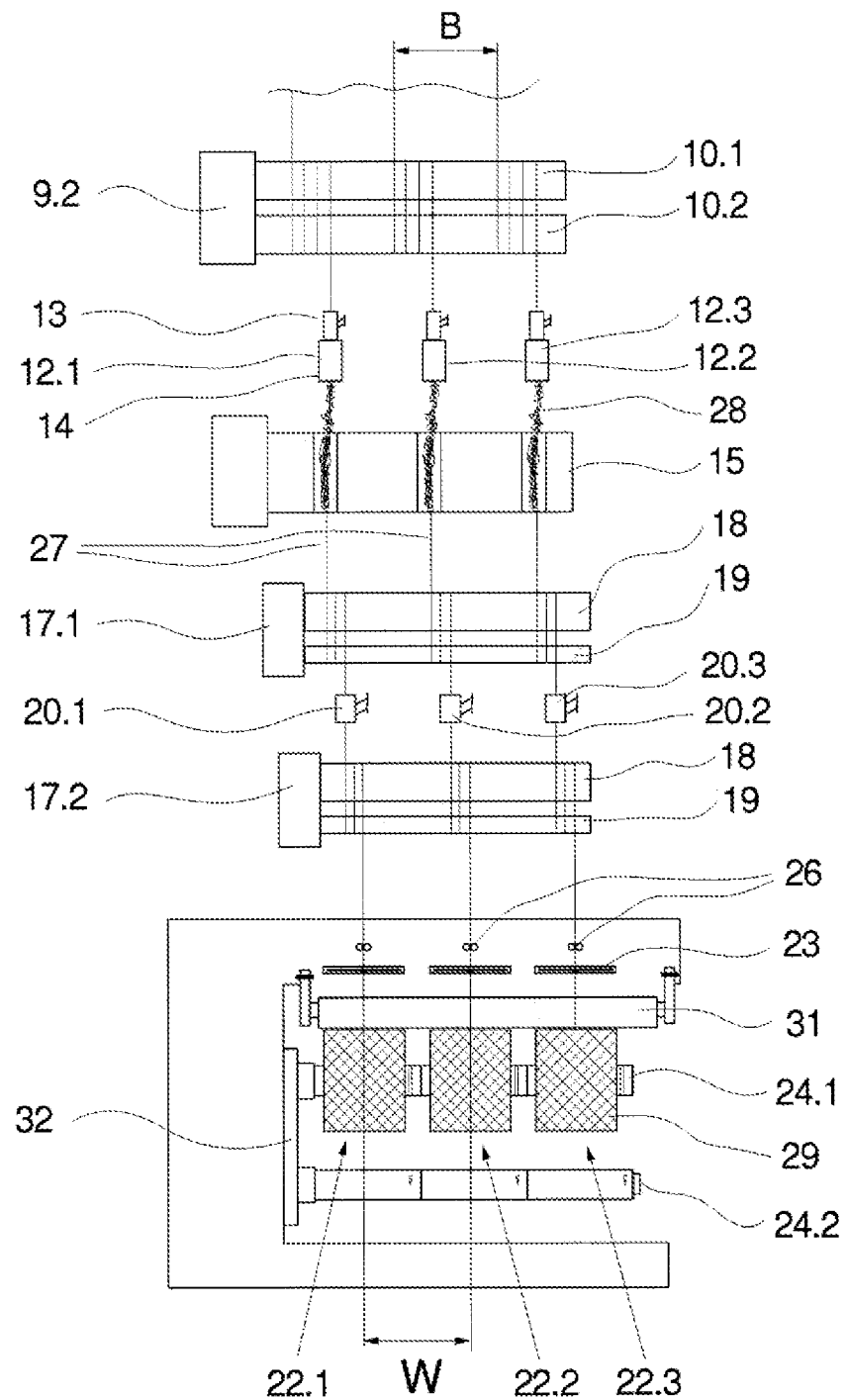

The method according to the invention will be explained in more detail hereunder by means of a few exemplary embodiments of the device according to the invention, with reference to the appended figures in which:

FIG. 1 schematically shows a view of a first exemplary embodiment of the device according to the invention;

FIG. 2 schematically shows a partial view of a further exemplary embodiment of the device according to the invention;

FIG. 3 schematically shows a partial view of a further exemplary embodiment of the device according to the invention.

A first exemplary embodiment of the device according to the invention for melt-spinning, drawing, crimping, and winding a plurality of threads is schematically shown in FIG. 1.

The device is composed of a spinning installation 1, a drawing installation 8, a crimping installation 11, a post-treatment installation 16, and a winding installation 21, which are disposed sequentially to form a thread run.

The spinning installation 1 in this exemplary embodiment is schematically illustrated by a spinning beam 2 having three spinning nozzles 3.1, 3.2, and 3.3, which are disposed beside one another on the lower side of the spinning beam 2. The spinning beam 2 is usually embodied so as to be heated, having a melt-distribution system and one or a plurality of spinning pumps. A melt which is infed from a melt source is infed to the spinning nozzles 3.1 to 3.3 by way of an infeed 4.

A cooling installation 5 is provided directly below the spinning beam 2, so as to cool the filament strands which are extruded by the spinning nozzles 3.1 to 3.3. A plurality of collective thread guides 6.1 to 6.3 are assigned to the cooling installation 5 in the lower region, so as to gather the filament bundles which are produced per spinning nozzle 3.1 to 3.3 so as to form in each case one thread 27.

The threads 27 are collectively drawn off from the spinning installation 1 as a thread skein. To this end, the drawing installation 8 has a first godet unit 9.1. The godet unit 9.1 is formed by two godets 10.1 and 10.2 which are held in a cantilevered manner, mounted at one side, and are each coupled to one drive. The godets 10.1 and 10.2 of the godet unit 9.1 are preferably embodied so as to be heated.

A second godet unit 9.2 which is likewise formed from two godets 10.1 and 10.2 is assigned to the godet unit 9.1. The godets 10.1 and 10.2 of the godet unit 9.2 are coupled to one drive.

The godet units 9.1 and 9.2 are usually driven at a differential speed, so as to collectively draw the threads 27 as a thread skein.

In order for the threads 27 to be guided on the godet units 9.1 and 9.2, a thread-skein guide 7 which sets a predefined treatment spacing between the threads is provided between the drawing installation 8 and the spinning installation 1. The treatment spacing between the threads 27 is chosen in such a manner that the threads 27 in a singularized manner and with a plurality of wrappings are guided beside one another on the circumference of the godet units 9.1 and 9.2.

In order for the threads 27 to be singularized, the latter at the commencement of the process are sequentially and with multiple wrappings threaded on the godet units 9.1 and 9.2. Thus, the treatment spacing between the threads is determined significantly by the number of wrappings of the individual threads on the godet units 9.1 and 9.2 The number of wrappings depends substantially on the thread treatment, in particular on the temperature control of the thread. In this way, six to twelve wrappings are usually required for drawing, in extreme cases three to twenty wrappings. This results in a treatment spacing in the range from 20 to 200 mm between adjacent threads.

As can be derived from the illustration in FIG. 1, the treatment spacing between the threads remains so as to be non-modified up to the winding installation 21. In particular in the case of the crimping installation 11, a pitch between adjacent texturing apparatuses that enables a straight thread run between the drawing installation 8 and the crimping installation 11 may thus be set. In this way, the crimping installation 11 has a plurality of texturing apparatuses 12.1 to 12.3 which are disposed at the mutual treatment spacing. To this end, the treatment spacing is identified in FIG. 1, using the reference letter B. In principle, however, it is also possible for the treatment spacing between the crimping installation 11 and the winding installation 21 to be embodied so as to be larger or smaller.

The texturing apparatuses 12.1 to 12.3 in this exemplary embodiment are each formed by one conveying nozzle 13 and a stuffer box 14. Texturing apparatuses of this type are well known so that no further explanation is offered at this point.

A cooling drum 15 is provided in order for the thread plugs 28 which are formed by the texturing apparatuses 12.1 to 12.3 to be received and cooled, the thread plugs 28 being guided on the circumference of said cooling drum 15 in parallel beside one another. The thread plugs 28 herein may be guided with a single wrapping or multiple wrappings on the circumference of the cooling drum 15.

A post-treatment installation 16 by way of which the thread plugs 28 each are dissolved to form one thread 27 and by way of which a post-treatment, in particular a thermal post-treatment, is carried out under tension, is assigned to the crimping installation 11. To this end, the post-treatment installation 16 has two godet units 17.1 and 17.2. each being formed by one godet 18 and one redirection roller 19. The godet 18 and the redirection roller 19 are disposed in a cantilevered manner, wherein the godet 18 is coupled to a drive.

A plurality of swirling apparatuses 20.1, 20.2, and 20.3, are disposed between the godet units 17.1 and 17.2. The swirling apparatuses 20.1, 20.2, and 20.3 likewise have the treatment spacing B therebetween such that the threads in the case of singularized guiding are guidable in parallel in a straight thread run, with a plurality of wrappings on the godet unit 17.1. After swirling, the threads 27 are received by the godet unit 17.2 and are guided likewise in a singularized manner beside one another, with a plurality of wrappings on the godet 18 and on the redirection roller 19.

At the end of the process, the crimped threads 27 are wound to form packages 29. To this end, the winding installation 21 for each thread has one winding position 22.1, 22.2, and 22.3. A winding spindle 24.1 for receiving the packages 29, and a traversing unit 23 and a contact roller 31 for placing the threads 27 are assigned to the winding positions 22.1, 22.2, and 22.3. The run-in of the threads 27 to the winding positions 22.1 to 22.3 is performed by way of what are referred to as head thread guides 26 which are disposed upstream of each of the winding positions 22.1 to 22.3. The winding spindle 24.1 is held on a winding turret 32 which, in order for the threads to be wound in a continuous manner, holds yet a second winding spindle 24.2.

As can be derived from the illustration in FIG. 1, the package width of the wound packages 29 requires a pitch between the winding positions 22.1 to 22.3. The pitch between the winding positions 22.1 to 22.3 herein is referred to as the winding spacing and in FIG. 1 is identified using the reference letter W. The winding spacing W between the winding positions 22.1 to 22.3 is larger than the treatment spacing B in the upstream post-treatment installation 16. A thread distributor guide 25 is thus provided between the winding installation 21 and the post-treatment installation 16, by way of which thread distributor guide 25 spreading out of the threads 27 is possible.

In the case of the exemplary embodiment of the device according to the invention illustrated in FIG. 1, a plurality of threads in parallel beside one another are spun from a plurality of spinning nozzles 3.1 to 3.3 by the spinning installation 1. The spinning nozzles 3.1 to 3.3 of the spinning installation 1 are each held on the spinning beam 2 at a mutual spinning spacing. The spinning spacing is identified in FIG. 1, using the reference letter S. The spinning spacing S in this exemplary embodiment is larger than the treatment spacing B in the drawing installation 8. Therefore, the threads 27 by the thread-skein guide 27 are forced together from the spinning spacing S to the treatment spacing B.

Drawing, crimping, and post-treating the threads 27 is performed with an advantageous parallel thread guiding such that no thread deflections or redirections and thus no additional thread-guiding elements are required between the drawing installation 8, the crimping installation 11, and the post-treatment installation 16. The threads 27 may be drawn, crimped, and post-treated under identical conditions. In this way, a high level of uniformity is possible in the production of the crimped threads.

The number of threads in the exemplary embodiment as per FIG. 1, having three threads, is exemplary. In principle, two or else more threads may be produced simultaneously as a thread skein as per the method according to the invention. It is essential herein that the threads are individually threaded on the godet units of the drawing installation 8, wherein the threads henceforth are treated and wound as one thread skein. The enlarged treatment spacing between the threads has proven successful in particular also in guiding the thread plugs 28 on the cooling drum 15. In this way, contact between the thread plugs may advantageously be completely avoided even in the case of multiple wrappings.

As can be derived from the illustration of FIG. 1, the instances of thread guiding in the entire process are determined substantially by the spinning spacing S of adjacent spinning nozzles, by the treatment spacing B of adjacent texturing apparatuses, and by the winding spacing W of adjacent winding positions. Usually, the spinning spacing S in the spinning installation 1, the treatment spacing B in the drawing installation 8, and the winding spacing W in the winding installation 21 are typically embodied in various sizes, depending on the apparatuses. However, by way of the method according to the invention and the device according to the invention, there is now the potential for parallel thread guiding to be implemented also between a spinning installation and a drawing installation, without having to surrender the advantages of thread-skein guiding.

An exemplary embodiment of the device according to the invention, in which thread guiding from spinning to drawing is performed without forcing together or spreading out threads, is illustrated in a partial view in FIG. 2. The exemplary embodiment as per FIG. 2 in terms of the parts of the device is substantially identical to the aforementioned exemplary embodiment such that reference is made to the aforementioned exemplary embodiment and only the points of differentiation will be explained at this point.

In the exemplary embodiment illustrated in FIG. 2, a plurality of individual godet units 30 are provided between the spinning installation 1 and the drawing installation 8, the threads 27 respectively being drawn off in parallel beside one another by said individual godet units 80 from the spinning installation 1. To this end, the individual godet units 30 have a spinning spacing S therebetween such that the threads 27 are drawn off in parallel beside one another from the spinning nozzles 3.1 to 3.3.

The threads 27 in a singularized manner and with a plurality of wrappings are guided and drawn beside one another on the circumference of the godet units 9.1 and 9.2. Subsequently, likewise in a parallel thread run, the threads are guided beside one another into the downstream crimping installation 11. In this case, the treatment spacing B between the adjacent texturing apparatuses 12.1, 12.2, and 12.3, is equal to the spinning spacing S.

In the case of the exemplary embodiment illustrated in FIG. 2 it is also possible for the threads to be drawn off directly by the godet unit 9.1, without the interposition of a plurality of individual godet units. Depending on the spinning spacing, the individual godet units could also be disposed so as to be mutually offset in the direction of the thread run. In all cases, the spinning spacing would be equal to the treatment spacing.

In principle, however, there is also the potential for the treatment spacing B for drawing, crimping, and post-treating, to be adapted to a winding spacing W of the winding installation 21. To this end, an exemplary embodiment of the device according to the invention is shown in FIG. 3, in which the threads without being spread out are guided from a post-treatment installation 16 to the winding positions 22.1 to 22.3 of the winding installation 21. No additional thread-guiding elements between the post-treatment installation 16 and the winding installation 21 are thus required.

The exemplary embodiment illustrated in FIG. 3, in terms of construction and function of the parts of the device, is identical to the first exemplary embodiment such that reference is made at this point to the aforementioned description.

The method according to the invention and the device according to the invention for melt-spinning, drawing, crimping, and winding a plurality of threads are thus particularly advantageous for obtaining thread guiding which is favorable to the production process. The thread pitch herein may be determined by the spinning-nozzle pitch, by the number of wrappings of the threads on the godets, by the pitch of the texturing apparatuses, or by the pitch of the winding positions. For the production process of what are referred to as BCF yarns, the primary variable is preferably what is referred to as the contact length for heating the thread on the circumference of the godets of the godet units. The thread pitch between the threads herein is chosen such that a sufficiently high number of wrappings is obtained at a sufficient spacing of the wrappings of a thread. The number of wrappings herein determines the dwelling time of the thread on the surface of the godet. This results in a required operating region per thread on the circumference of the godets, and thus in a treatment spacing between the various threads.

The parts of the device shown in the exemplary embodiments as per FIGS. 1 and 2 are exemplary. In this way, the drawing installation could also be formed from a combination of individual godet units and one godet unit. The texturing apparatuses are likewise exemplary. Apart from the stuffer-box principle, other crimping principles could also be applied.

The invention claimed is:

1. Method for melt-spinning, drawing, crimping, and winding a plurality of threads, in which method the threads from a plurality of spinning nozzles are spun beside one another, on at least one godet unit are collectively guided as a thread skein, are drawn, and for crimping are subsequently guided beside one another to a plurality of texturing apparatuses, wherein the threads in a singularized manner and with a plurality of wrappings are guided beside one another on the godet unit, and in which method the threads after running off from the godet unit are guided into the texturing apparatuses in a straight thread run in parallel beside one another.

2. Method as claimed in claim 1, wherein for crimping the threads are each compressed to form a thread plug, and in that the thread plugs are guided in parallel beside one another, and are dissolved to form crimped threads.

3. Method as claimed in claim 2, wherein the threads after crimping are drawn off in parallel beside one another by a godet unit, wherein the threads in a singularized manner and with a plurality of wrappings are guided beside one another on the godet unit.

4. Method as claimed in claim 1, wherein the threads after being spun are drawn and crimped in parallel beside one another at a mutual spinning spacing.

5. Method as claimed in claim 1 wherein the threads before being wound to form a plurality of packages are drawn and crimped in parallel beside one another, at a mutual winding spacing which is contingent on the packages.

6. Method as claimed in claim 1, wherein the threads after being spun and until being wound to form packages are guided in parallel at a mutual spacing.

7. Device for melt-spinning, drawing, crimping, and winding a plurality of threads, the device being composed of
a spinning device having a plurality of spinning nozzles,
a drawing installation having at least one godet unit,
a crimping installation having a plurality of texturing apparatuses, and
a winding installation having a plurality of winding positions,
wherein adjacent texturing apparatuses of the crimping installation therebetween form a treatment spacing in such a manner that the threads in the case of singularized guiding with a plurality of wrappings on the godet unit of the drawing installation are capable of being guided in parallel and in a straight thread run.

8. Device as claimed in claim 7, wherein the treatment spacing between the texturing apparatuses is determined by a number of wrappings of one of the threads on the godet unit.

9. Device as claimed in claim 7, wherein the crimping installation has a post-treatment installation having a plurality of swirling apparatuses, and wherein adjacent swirling apparatuses are held at the mutual treatment spacing.

10. Device as claimed in claim 7, wherein adjacent spinning nozzles of the spinning installation therebetween form a spinning spacing, and in that the spinning spacing between the spinning nozzles is equal to the treatment spacing between the texturing apparatuses.

11. Device as claimed in claim 7, wherein adjacent winding positions of the winding installation therebetween form a winding spacing, and in that the winding spacing between the winding positions is equal to the treatment spacing between the texturing apparatuses.

12. Device as claimed in claim 7, wherein adjacent spinning nozzles of the spinning installation therebetween form a spinning spacing, and in that the spinning spacing between the spinning nozzles is equal to the treatment spacing between the texturing apparatuses; and wherein adjacent winding positions of the winding installation therebetween form a winding spacing, and in that the winding spacing between the winding positions is equal to the treatment spacing between the texturing apparatuses.

13. Device as claimed in claim 12, wherein the spinning spacing between adjacent spinning nozzles, and the winding spacing between adjacent winding positions are of identical size.

* * * * *